US012366356B2

(12) United States Patent  Kalika

(10) Patent No.: US 12,366,356 B2
(45) Date of Patent: Jul. 22, 2025

(54) TWO-STAGE CATALYTIC HEATING SYSTEMS AND METHODS OF OPERATING THEREOF

(71) Applicant: Proof Energy Inc., Fremont, CA (US)

(72) Inventor: Vlad Kalika, Ladera Ranch, CA (US)

(73) Assignee: Proof Energy Inc., Fremont, CA (US)

( * ) Notice: Subject to any disclaimer, the term of this patent is extended or adjusted under 35 U.S.C. 154(b) by 436 days.

(21) Appl. No.: 17/377,933

(22) Filed: Jul. 16, 2021

(65) Prior Publication Data
US 2023/0014723 A1   Jan. 19, 2023

(51) Int. Cl.
*F23C 13/04*   (2006.01)
*B01J 19/00*   (2006.01)
(Continued)

(52) U.S. Cl.
CPC ........... *F23C 13/04* (2013.01); *B01J 19/0013* (2013.01); *B01J 19/245* (2013.01); *B01J 23/44* (2013.01); *B01J 23/63* (2013.01); *B60H 1/00278* (2013.01); *B60H 1/2209* (2013.01); *F23C 7/008* (2013.01); *F23C 13/02* (2013.01); *F23N 1/042* (2013.01); *H01M 10/615* (2015.04);
(Continued)

(58) Field of Classification Search
CPC ................................. F23C 13/04; F23C 13/00
See application file for complete search history.

(56) References Cited

U.S. PATENT DOCUMENTS

| 4,365,952 A | 12/1982 | Ohmukai et al. |
| 4,657,829 A | 4/1987 | McElroy et al. |

(Continued)

FOREIGN PATENT DOCUMENTS

| CN | 212457515 U | 2/2021 | |
| DE | 19711681 A1 * | 10/1997 | ............. F23C 13/00 |

(Continued)

OTHER PUBLICATIONS

U.S. Appl. No. 17/514,622, Non Final Office Action mailed Mar. 13, 2024, 11 pgs.

(Continued)

*Primary Examiner* — Michael G Hoang
*Assistant Examiner* — Kurt Wolford
(74) *Attorney, Agent, or Firm* — Polygon IP, LLP

(57) ABSTRACT

Described herein are two-stage catalytic heating systems and methods of operating thereof. A system comprises a first-stage catalytic reactor and a second-stage catalytic reactor, configured to operate in sequence and at different operating conditions, For example, the first-stage catalytic reactor is supplied with fuel and oxidant at fuel-rich conditions. The first-stage catalytic reactor generates syngas. The syngas is flown into the second-stage catalytic reactor together with some additional oxidant. The second-stage catalytic reactor operates at fuel-lean conditions and generates exhaust. Splitting the overall fuel oxidation process between the two catalytic reactors allows operating these reactors away from the stoichiometric fuel-oxidant ratio and avoiding excessive temperatures in these reactors. As a result, fewer pollutants are generated during the operation of two-stage catalytic heating systems. For example, the temperatures are maintained below 1.000° C. at all oxidation stages.

20 Claims, 8 Drawing Sheets

(51) Int. Cl.
| | |
|---|---|
| B01J 19/24 | (2006.01) |
| B01J 23/44 | (2006.01) |
| B01J 23/63 | (2006.01) |
| B60H 1/00 | (2006.01) |
| B60H 1/22 | (2006.01) |
| F23C 7/00 | (2006.01) |
| F23C 13/02 | (2006.01) |
| F23N 1/04 | (2006.01) |
| H01M 10/615 | (2014.01) |
| H01M 10/6595 | (2014.01) |

(52) U.S. Cl.
CPC .............. *H01M 10/6595* (2015.04); *B01J 2219/00087* (2013.01); *B01J 2219/00164* (2013.01); *F23C 2201/20* (2013.01); *F23C 2900/06041* (2013.01); *F23C 2900/13001* (2013.01); *F23C 2900/99011* (2013.01); *F23N 2225/16* (2020.01); *F23N 2225/20* (2020.01); *F23N 2225/21* (2020.01); *H01M 2220/20* (2013.01)

(56) References Cited

U.S. PATENT DOCUMENTS

| | | | |
|---|---|---|---|
| 5,797,737 A | | 8/1998 | Gal et al. |
| 6,000,212 A | * | 12/1999 | Kolaczkowski ........ F23R 3/346 |
| | | | 60/776 |
| 2005/0042567 A1 | * | 2/2005 | Sasaki .................... F23C 13/00 |
| | | | 431/328 |
| 2006/0080967 A1 | * | 4/2006 | Colket, III .............. F23C 13/00 |
| | | | 60/777 |
| 2006/0257707 A1 | | 11/2006 | Kaschmitter et al. |
| 2007/0042301 A1 | * | 2/2007 | Carroni ................... F23C 13/00 |
| | | | 431/328 |
| 2007/0054226 A1 | | 3/2007 | Carroni et al. |
| 2007/0158451 A1 | | 7/2007 | Mao et al. |
| 2008/0127553 A1 | | 6/2008 | Roychoudhury et al. |
| 2009/0053661 A1 | | 2/2009 | Kinnunen |
| 2009/0123885 A1 | | 5/2009 | Vestin |
| 2010/0139599 A1 | | 6/2010 | Vestin |
| 2011/0129393 A1 | | 6/2011 | Lecea et al. |
| 2012/0164547 A1 | | 6/2012 | Weingaertner et al. |
| 2018/0356092 A1 | | 12/2018 | Phillips et al. |
| 2023/0132692 A1 | | 5/2023 | Kalika |

FOREIGN PATENT DOCUMENTS

| | | | | |
|---|---|---|---|---|
| GB | 2295008 A | * | 5/1996 | .............. F23C 13/00 |
| GB | 2488351 A | * | 8/2012 | .............. F23C 13/04 |
| JP | H10103614 A | | 4/1998 | |
| WO | 2023288303 A1 | | 1/2023 | |
| WO | 2023077033 A1 | | 5/2023 | |

OTHER PUBLICATIONS

Int'l Application Serial No. PCT/US22/78826, Search Report and Written Opinion mailed Feb. 16, 2023, 8 pgs.

International Application No. PCT/US2022/073779, Search Report and Written Opinion mailed Nov. 3, 2022.

* cited by examiner

TWO-STAGE CATALYTIC HEATING SYSTEMS AND METHODS OF OPERATING THEREOF

BACKGROUND

Many types of vehicles, especially medium-duty and heavy-duty vehicles, are shifting towards electrification. Currently, conventional electric heaters (e.g., resistive heaters, radiant heaters) are used to provide desirable cabin temperatures, windshield defrosting, battery heating, and the like. Unfortunately, these electric heaters consume significant amounts of the electrical energy stored in the vehicle battery packs. This energy consumption (for heating) reduces the vehicle range, which can be as high as 50% in some cold climates. Increasing the battery pack capacity is expensive and increases vehicle weight. At the same time, conventional fuel-fired heaters produce significant emissions due to the minimal control of the burning conditions. Specifically, fuel-fired heaters operate at high temperatures causing nitrogen oxidation and other pollutants. As a result, fuel-fired heaters are generally not suitable for many vehicle applications.

SUMMARY

Described herein are two-stage catalytic heating systems and methods of operating thereof. A system comprises a first-stage catalytic reactor and a second-stage catalytic reactor, configured to operate in sequence and at different operating conditions, For example, the first-stage catalytic reactor is supplied with fuel and oxidant at fuel-rich conditions. The first-stage catalytic reactor generates syngas. The syngas is flown into the second-stage catalytic reactor together with some additional oxidant. The second-stage catalytic reactor operates at fuel-lean conditions and generates exhaust. Splitting the overall fuel oxidation process between the two catalytic reactors allows operating these reactors away from the stoichiometric fuel-oxidant ratio and avoiding excessive temperatures in these reactors. As a result, fewer pollutants are generated during the operation of two-stage catalytic heating systems. For example, the temperatures are maintained below 1000° C. at all oxidation stages.

In some examples, a two-stage catalytic heating system uses fuel and oxidant to generate heat. The two-stage catalytic heating system comprises a first-stage catalytic reactor and a second-stage catalytic reactor. The first-stage catalytic reactor comprises a first-reactor fuel inlet, a first-reactor oxidant inlet, a first-reactor outlet, and a first-reactor catalyst. The first-stage catalytic reactor is configured to operate at fuel-rich conditions. The second-stage catalytic reactor comprises a second-reactor fuel inlet fluidically coupled to the first-reactor outlet, a second-reactor oxidant inlet, a second-reactor outlet, and a second-reactor catalyst. The second-stage catalytic reactor is configured to operate at fuel-lean conditions.

In some examples, the two-stage catalytic heating system further comprises a fuel supply, fluidically coupled to the first-reactor fuel inlet and configured to supply the fuel to the first-stage catalytic reactor at a fuel flow rate. The two-stage catalytic heating system also comprises an oxidant supply, fluidically coupled to each of the first-reactor oxidant inlet and the second-reactor oxidant inlet and configured to supply the oxidant to the first-reactor oxidant inlet at a first oxidant flow rate and to the second-reactor oxidant inlet at a second oxidant flow rate. A combination of the fuel flow rate and the first oxidant flow rate determines the fuel-rich conditions in the first-stage catalytic reactor. Furthermore, a combination of the fuel flow rate, the first oxidant flow rate, and the second oxidant flow rate determines the fuel-lean conditions in the second-stage catalytic reactor. In some examples, the first oxidant flow rate and the second oxidant flow rate are independently controllable.

In some examples, the first-stage catalytic reactor further comprises a first-reactor preheater for preheating the first-reactor catalyst, at least prior to supplying the fuel to the first-stage catalytic reactor.

In some examples, the fuel selected from the group consisting of methanol, ethanol, and natural gas.

In some examples, the first-reactor catalyst comprises one or more of rhodium and coria. In the same or other examples, the second-reactor catalyst comprises one or more of platinum and palladium.

In some examples, the two-stage catalytic heating system is configured to operate the first-reactor catalyst and the second-reactor catalyst at different temperatures.

In some examples, the two-stage catalytic heating system further comprises a system controller communicatively coupled to each of the first-stage catalytic reactor and the second-stage catalytic reactor. The system controller is configured to maintain the fuel-rich conditions in the first-stage catalytic reactor and the fuel-lean conditions in the second-stage catalytic reactor by controlling a fuel flow rate into the first-stage catalytic reactor, a first oxidant flow rate into the first-stage catalytic reactor, and the second oxidant flow rate into the second-stage catalytic reactor. In more specific examples, the system controller is configured to receive one or more inputs from the first-stage catalytic reactor and the second-stage catalytic reactor, the one or more inputs comprises at least one of temperature of the first-reactor catalyst, temperature of the second-reactor catalyst, temperature of syngas flowing from the first-stage catalytic reactor to the second-stage catalytic reactor, and temperature of exhaust leaving the second-stage catalytic reactor.

In some examples, the two-stage catalytic heating system further comprises a heat exchanger, fluidically coupled to the second-reactor outlet and configured to receive exhaust from the second-stage catalytic reactor and to transfer the heat from the exhaust to a thermal fluid flowing through the heat exchanger.

Also disclosed is a method of operating a two-stage catalytic heating system using fuel and oxidant to generate heat. In some examples, the method comprises flowing fuel and a first oxidant portion into a first-stage catalytic reactor comprising a first-reactor catalyst. The fuel and the first oxidant portion form a fuel-rich mixture converted into a syngas when contacting the first-reactor catalyst. The method also comprises flowing the syngas and a second oxidant portion into a second-stage catalytic reactor comprising a second-reactor catalyst. The syngas and the second oxidant portion form a fuel-lean mixture converted into exhaust when contacting the second-reactor catalyst.

In some examples, the method further comprises, prior to flowing the fuel and the first oxidant portion into the first-stage catalytic reactor, heating the first-reactor catalyst using a first-reactor preheater to a temperature of at least a first-reactor fuel-supplying threshold. In some examples, heating the first-reactor catalyst using the first-reactor preheater continues while flowing the fuel and the first oxidant portion into the first-stage catalytic reactor.

In sonic examples, the temperature of the first-reactor catalyst is maintained at a first operating target by individually controlling the flow rate of the fuel and the flow rate of the first oxidant portion. For example, the temperature of each of the first-reactor catalyst and the second-reactor catalyst is maintained below 1000° C. In some specific examples, the first-stage catalytic reactor and the second-stage catalytic reactor are maintained at different operating temperatures. For example, the first-stage catalytic reactor is maintained at a lower operating temperature than the second-stage catalytic reactor. In more specific examples, the first-stage catalytic reactor is operated at between 500° C. and 700° C., and the second-stage catalytic reactor is operated at between 600° C. and 800° C.

In some examples, the fuel-rich mixture (in the first-stage catalytic reactor) has an equivalence ratio of the first oxidant portion to the fuel of less than 0.75. The fuel-lean mixture (in the second-stage catalytic reactor) has an equivalence ratio of the second oxidant portion to the syngas of at least 1.5.

In some examples, the fuel comprises at least one of ethanol or methanol.

These and other embodiments are described further below with reference to the figures.

DETAILED DESCRIPTION

Figure 1:
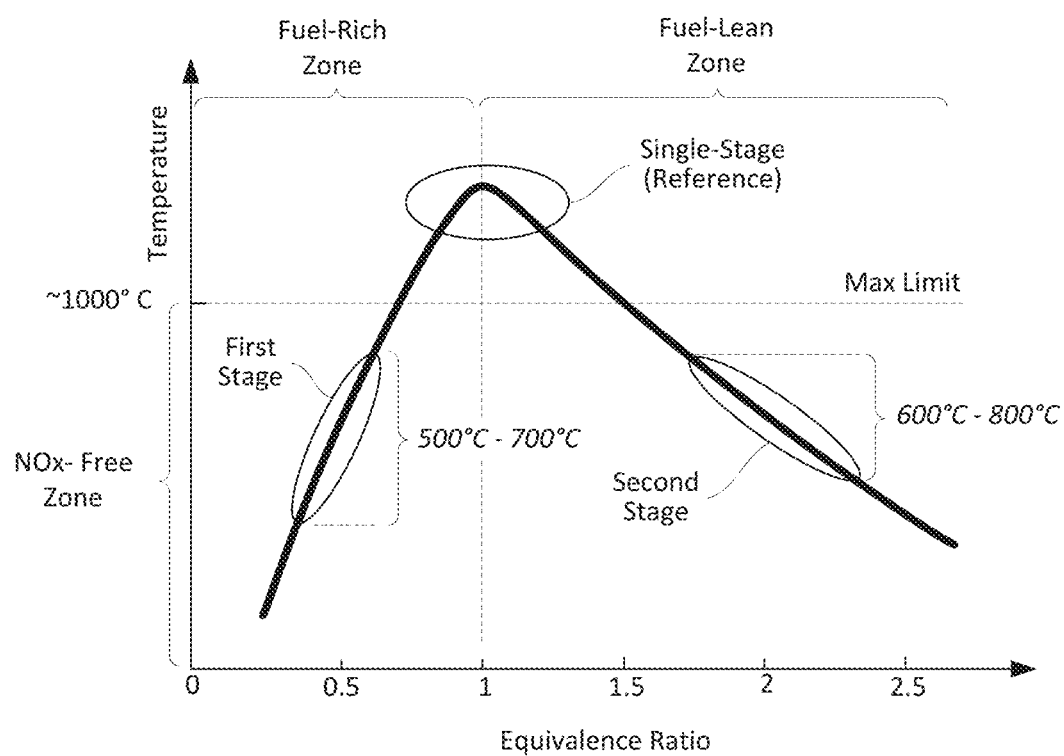
FIG. 1 is a temperature plot as a function of the oxidant-fuel equivalence ratio.

In the following description, numerous specific details are set forth to provide a thorough understanding of the presented concepts. The presented concepts may be practiced without some or all of these specific details. In other instances, well-known process operations have not been described in detail so as to not unnecessarily obscure the described concepts. While some concepts will be described in conjunction with the specific embodiments, it will be understood that these embodiments are not intended to be limiting.

INTRODUCTION

As noted above, vehicles use various types of heaters for heating the interior, defrosting the windows, and, in some examples, preheating parts of the power train (e.g., battery packs). Conventional resistive heaters and fuel-fired heaters present various issues (e.g., range reduction, pollution), which makes them unsuitable for some types of vehicles (e.g., electrical vehicles and, in particular, medium and heavy-duty electrical trucks).

Unlike fuel-fired heaters, catalytic heaters can provide more control of the fuel oxidation conditions. For example, single-stage catalytic heaters have been proposed to reduce combustion temperatures, which generally corresponds to less emission. However, direct fuel oxidation, especially, direct oxidation of renewable fuels (e.g., ethanol, methanol, natural gas) can be challenging. Specifically, oxidation reactions can be very unstable, resulting in "flameouts" that produce undesirable emissions (e.g., unreacted fuel, nitrogen oxide emissions).

Described herein are two-stage catalytic heating systems, which address these problems by separating the overall fuel oxidation into two separate stages: (1) a fuel-rich oxidation stage (upstream) and (2) a fuel-lean oxidation stage (downstream). Each stage is physically separated (e.g., connected by a syngas line) and independently controlled. Specifically, each oxidation stage is performed in a dedicated catalytic reactor, e.g., a first-stage catalytic reactor (operating at fuel-rich conditions) and a second-stage catalytic reactor (operating at fuel-lean conditions). The first-stage catalytic reactor may be referred to as a primary catalytic reactor, while the second-stage catalytic reactor may be referred to as a secondary catalytic reactor. In a similar manner, the fuel-rich oxidation stage may be referred to as a primary stage, while the fuel-lean oxidation stage may be referred to as a secondary stage.

In the primary stage, the fuel and first oxidant portion enter the first-stage catalytic reactor where the fuel is oxidized at the fuel-rich conditions to form syngas. The flow rates of the fuel and the first oxidant portion are specifically controlled to achieve these fuel-rich conditions. The syngas is then combined with a second oxidant portion and this combination is flown into the second-stage catalytic reactor, where the syngas is further oxidized at the fuel-lean conditions to form exhaust. The flow rate of the second oxidant portion is specifically controlled to achieve these fuel-lean conditions. By using specific fuel-rich and fuel-lean conditions in these two catalytic reactors, the temperature in each catalytic reactor is maintained below a set maximum limit, e.g., 1000° C. These lower temperatures (in comparison to the direct-burning temperatures of ethanol, methanol, natural gas of 1920-1950° C.) help with reducing emissions, such as forming nitrogen oxides, as further described below.

FIG. 1 is a temperature plot as a function of the oxidant-fuel equivalence ratio for one example of the fuel-oxidant combination. The equivalence ratio of 1 (i.e., equivalence ratio=1) is defined as a stoichiometric ratio of the oxidant to the fuel, needed for the full oxidation of the fuel without any residual oxidant/oxidant excess. For example, each methane molecule requires two oxygen molecules for the full oxidation as shown in the following formula:

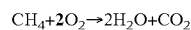

In other words, the equivalence ratio of 1 corresponds to a molar ratio of 1:2 for $CH_4:O_2$ for this oxidation. In another example, each methanol molecule requires 3/2 oxygen molecules for the full oxidation as shown in the following formula:

$$CH_3OH + 1.5O_2 \rightarrow CO_2 + 2H_2O$$

In other words, the equivalence ratio of 1 corresponds to a molar ratio of 1:1.5 for $CH_3OH:O_2$ for this oxidation. In yet another example, each ethanol molecule requires 3 oxygen molecules for the full oxidation as shown in the following formula:

$$C_2H_5OH + 3O_2 \rightarrow 2CO_2 + 3H_2O$$

In other words, the equivalence ratio of 1 corresponds to a molar ratio of 1:3 for $C_2H_5OH:O_2$ for this oxidation.

However, if the oxidation is performed at an equivalence ratio of 1 for the above fuel examples, the temperature far exceeds the maximum limit. As a result, single-stage oxidation (identified as a "single-stage" reference in FIG. 1) is generally not a suitable option for reducing the operating temperature.

Referring to FIG. 1, performing the first-stage oxidation using a fuel-rich mixture allows lowering the operating temperature below the maximum limit. The fuel-rich mixture has an equivalence ratio of less than 1, e.g., less than 0.75 or even less than 0.6. Furthermore, performing second-stage oxidation using a fuel-lean mixture also allows lowering the operating temperature below this maximum limit. The fuel-lean mixture has an equivalence ratio of greater than 1, e.g., greater than 1.5 or even greater than 1.75. Referring to the two-stage ethanol oxidation example, the first stage can be represented by the following formula:

$$Stage1: C_2H_5OH + 0.5O_2(air) + 2N_2(air) \rightarrow 2CO + 3H_2 + 2N_2 (500° C.-700° C.)$$

Nitrogen represents an inert component of the air, which can be used as a source of oxygen. Nitrogen does not react with oxygen at these temperatures and is simply carried through the first-stage catalytic reactor. A combination of $2CO + 3H_2 + 2N_2$ may be referred to as synthesis gas or syngas. The syngas is combined with additional air ($4O_2 + 16N_2$) upon entering the second-stage catalytic reactor. The second stage can be represented by the following formula:

$$Stage2: 2CO + 3H_2 2N_2 + 4O_2 + 16N_2 \rightarrow 2CO_2 + 3H_2O + 1.5O_2 + 18N_2 (600° C. 800° C.)$$

Carbon monoxide and hydrogen in the syngas are fully oxidized (using additional oxygen from the air) to form carbon dioxide and water, respectively. However, nitrogen again does not react with oxygen at the second-stage temperatures and is simply carried through the second-stage catalytic reactor. Carbon dioxide, water, unreacted nitrogen, and some remaining oxygen (oxygen excess in the fuel-lean mixture) form exhaust, which can be used to recover heat.

The two-stage methanol oxidation example can be represented by the following formulas:

$$Stage1: 2CH_3OH + 0.5O_2(air) + 2N_2(air) \rightarrow 2CO + 4H_2 + 2N_2 (500° C.-700° C.)$$

$$Stage2: 2CO + 4H_2 + 2N_2 + 5O_2 + 20N_2 \rightarrow 2CO_2 + 4H_2O + 3O_2 + 22N_2 (800° C.-1000° C.)$$

Overall, the two-stage catalytic heating system allows avoiding excessive temperatures during the overall oxidation process. As noted above, these higher temperatures are associated with the equivalence ratio of about 1 and cause nitrogen oxides and other pollutants. A fuel mixture in each catalytic reactor is specifically controlled by the fuel and oxidant flow rates to achieve either a fuel-rich condition (in the first-stage catalytic reactor) or a fuel-lean condition (in the second-stage catalytic reactor).

Examples of Two-Stage Catalytic Heating Systems

Figure 2A:
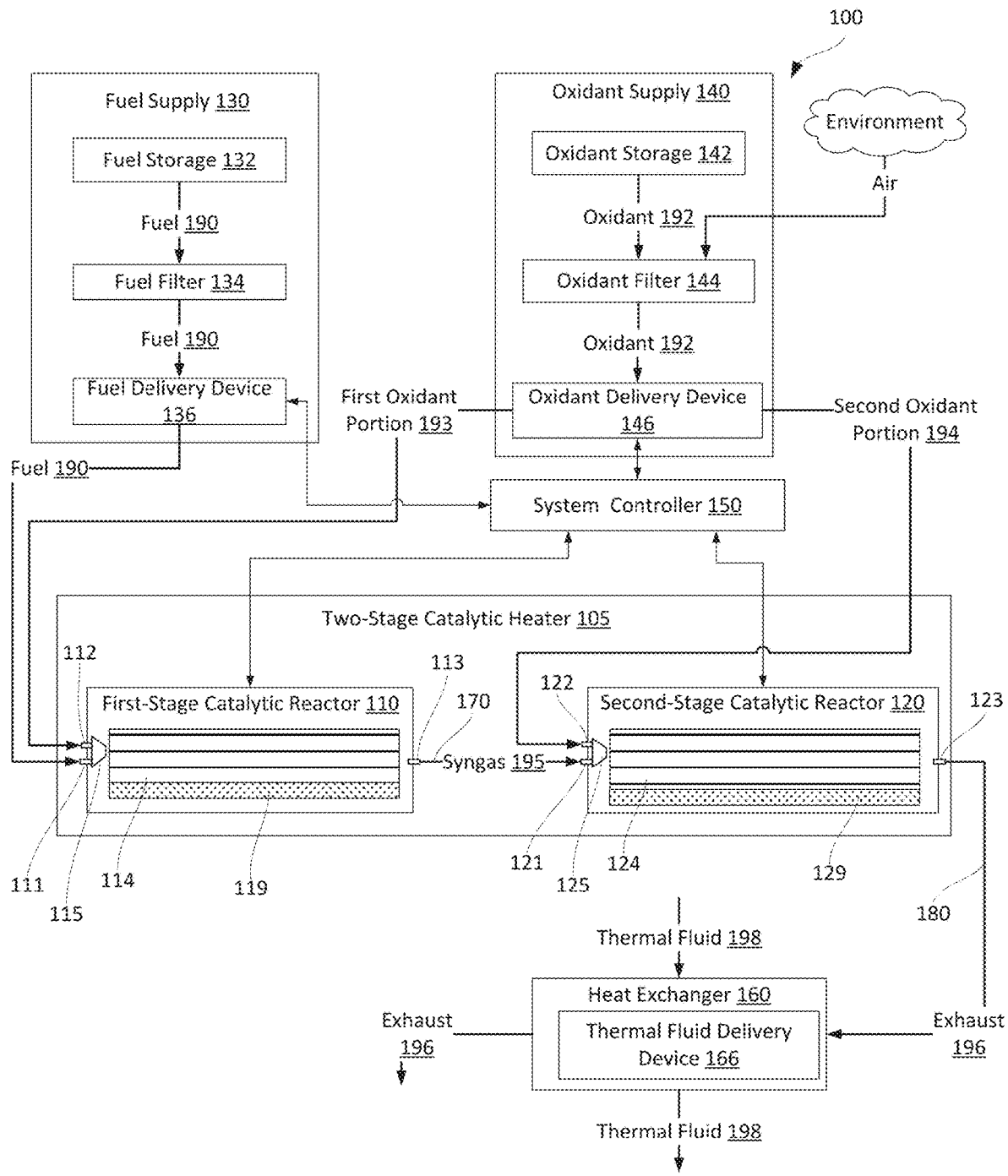
FIG. 2A is a block diagram of a two-stage catalytic heating system, in accordance with some examples.

FIG. 2A is a block diagram of two-stage catalytic heating system 100, in accordance with some examples. Two-stage catalytic heating system 100 is configured to use various types of fuels and oxidants to produce heat in an environmentally friendly manner, e.g., without or at least with minimal generation of nitrogen oxides and other pollutants. Two-stage catalytic heating system 100 comprises two-stage catalytic heater 105, fuel supply 130, and oxidant supply 140. In some examples, two-stage catalytic heating system 100 comprises system controller 150, which receives input from and control operations of various other components of two-stage catalytic heating system 100.

Two-stage catalytic heater 105 comprises first-stage catalytic reactor 110 and second-stage catalytic reactor 120, which are connected and operated in a sequence. Specifically, first-stage catalytic reactor 110 comprises first-reactor fuel inlet 111, first-reactor oxidant inlet 112, first-reactor outlet 113, and first-reactor catalyst 114. First-reactor fuel inlet 111 is configured to supply fuel 190 from fuel supply 130 (or from another source) into first-stage catalytic reactor 110. For example, fuel supply 1.30 is fluidically coupled to first-reactor fuel inlet 111 and configured to supply fuel 190 to first-stage catalytic reactor 110 at a fuel flow rate. In some examples, the fuel flow rate is fully or at least partially controlled by first-stage catalytic reactor 110, e.g., a valve positioned in first-reactor fuel inlet 111. In the same or other examples, first-reactor oxidant inlet 112 is configured to supply first oxidant portion 193 from oxidant supply 140 (or from another source) into first-stage catalytic reactor 110. The flow rate of first oxidant portion 193 is controlled by oxidant supply 140 and/or first-stage catalytic reactor 110, e.g., a valve positioned in first-reactor oxidant inlet 112. First-reactor catalyst 114 is configured to convert fuel 190 and first oxidant portion 193 into syngas 195, which exits first-stage catalytic reactor 110 through first-reactor outlet 113 and transmitted into second-stage catalytic reactor 120 via, e.g., syngas line 170.

Second-stage catalytic reactor 120 comprises second-reactor fuel inlet 121 fluidically coupled to first-reactor outlet 113 (e.g., by syngas line 170), second-reactor oxidant inlet 122, second-reactor outlet 123, and second-reactor catalyst 124, In some examples, second-reactor catalyst 124 has a different composition from first-reactor catalyst 114 as further described below. Second-reactor fuel inlet 121 is configured to supply syngas 195 from first-stage catalytic reactor 110 or, more specifically, from first-reactor outlet 113 into second-reactor fuel inlet 121 via syngas line 170. In some examples, the entire amount of syngas 195 generated in first-stage catalytic reactor 110 is supplied into second-stage catalytic reactor 120. Alternatively, a portion of syngas 195 is diverted, e.g., to supply other components. This diversion may be used, e.g., to control the flow rate of syngas 195 into second-stage catalytic reactor 120.

Second-reactor oxidant inlet 122 is configured to supply second oxidant portion 194 from oxidant supply 140 (or another source, e.g., air from the environment) into second-stage catalytic reactor 120. Specifically, oxidant supply 140 is fluidically coupled to each of first-reactor oxidant inlet 112 and second-reactor oxidant inlet 122 and configured to supply oxidant 192 to first-reactor oxidant inlet 112 at a first oxidant flow rate and to second-reactor oxidant inlet 122 at a second oxidant flow rate, These oxidant flow rates are specifically selected and controlled to achieve fuel-rich conditions in first-stage catalytic reactor 110 and, independently, fuel-lean conditions in second-stage catalytic reactor 120 as, e.g., described above with reference to FIG. 1. Second-reactor catalyst 124 is configured to convert syngas 195 and second oxidant portion 194 into exhaust 196, which exits second-stage catalytic reactor 120 through second-reactor outlet 123 and into exhaust line 180.

Referring to FIG. 2A, in some examples, fuel supply 130 comprises fuel storage 132, fuel filter 134, and/or fuel delivery device 136 (e.g., a fuel pump, a fuel compressor). Depending on the integration of two-stage catalytic heating system 100, one or more of these components can be also parts of another system, e.g., a vehicle. For example, fuel storage 132 can be a vehicle fuel tank, fuel filter 134 can be a vehicle fuel filter, and fuel delivery device 136 can be a vehicle fuel pump. Some aspects of this integration are described below with reference to FIG. 3. In some examples, fuel supply 130 is configured to supply and, in more specific examples, to store fuel 190, such as methanol, ethanol, and natural gas or, more specifically, bio-methanol, bio-ethanol, and biogas. Other fuel examples include, but are not limited to, propane, butane, and isopropanol. It should be noted that some of these fuel examples are renewable (e.g., bio-methanol, bio-ethanol, and biogas)

In some examples, fuel storage 132 is a replaceable cartridge. Unlike conventional fuel tanks, replaceable cartridges do not require any specific emission controls when used in a vehicle or, more specifically, in two-stage catalytic heating system 100. A replaceable cartridge comprises a connecting port for connecting to the fuel line two-stage catalytic heating system 100. For example, a replaceable cartridge can be plugged into a fuel canister shell of fuel supply 130. The shell can be mounted on a vehicle and would protect the replaceable cartridge from road hazards.

Referring to FIG. 2A, in some examples, oxidant supply 140 comprises oxidant storage 142, oxidant filter 144, and/or oxidant delivery device 146. In some examples, oxidant 192 is oxygen in the air, which is obtained from the environment, In these examples, oxidant storage 142 is not present. It should be noted that the air also contains nitrogen, which passes through two-stage catalytic heating system 100 substantially unreacted. Oxidant storage 142 can be used when the ambient air is not available, e.g., mining applications, underwater applications, and the like. Some features of oxidant supply 140 can be provided by other vehicle systems, e.g., vehicle air filter, supercharger, turbocharger, and the like.

In some examples, oxidant delivery device 146 is configured to split oxidant 192 into first oxidant portion 193, delivered at the first oxidant flow rate to first-stage catalytic reactor 110, and into second oxidant portion 194, delivered at the second oxidant flow rate to second-stage catalytic reactor 120. In more specific examples, the first oxidant flow rate and second oxidant flow rate are independently controlled, e.g., by oxidant delivery device 146 and/or other components (e.g., valves at the respective reactor inlets). For example, oxidant delivery device 146 comprises control valves, one for each of two oxidant lines connecting oxidant delivery device 146 with first-stage catalytic reactor 110 and second-stage catalytic reactor 120. In some examples, oxidant delivery device 146 is a compressor.

Each of first-stage catalytic reactor 110 and second-stage catalytic reactor 120 will now be described in more detail. As noted above, first-stage catalytic reactor 110 comprises first-reactor catalyst 114. In some examples, first-reactor catalyst 1:14 comprises one or both of rhodium and ceria. In some examples, second-reactor catalyst 124 comprises one or both of platinum and palladium. These catalysts are specifically selected to achieve the partial oxidation of fuel in 190 in first-stage catalytic reactor 110 and, later, the full oxidation of syngas 195 in second-stage catalytic reactor 120. In some examples, first-reactor catalyst 114 and/or second-reactor catalyst 124 is arranged as a layer (e.g., formed in part by catalyst particles) on a support structure (e.g., such as metallic support). Lower operating temperatures of these reactors allow using metallic support, rather than ceramic support that is common in a conventional catalytic converter. In comparison to ceramic supports, metallic supports are more robust to vibration and temperature fluctuations. Furthermore, metallic supports have better thermal conductivity, which is important for catalyst preheating and maintaining uniform temperature throughout the entire catalyst. The metallic supports may be specifically configured to balance the flow rate through the reactor and the operating surface area.

In some examples, first-stage catalytic reactor 110 further comprises fuel-oxidant mixer 115, which is fluidically coupled to first-reactor fuel inlet 111 and first-reactor oxidant inlet 112. Some examples of fuel-oxidant mixer 115 are injectors, jets, showerheads, nozzles (e.g., swirl nozzle), Venturi devices, and the like. In some examples, first-reactor fuel inlet 111 first-reactor oxidant inlet 112, and/or fuel-oxidant mixer 115 are configured to control the fuel flow rate and/or the first oxidant flow rate. More specifically, fuel-oxidant mixer 115 comprises one or two valves, controlled by system controller 150. Alternatively, fuel-oxidant mixer 115 is a passive distribution device, while the fuel flow rate and the first oxidant flow rate are controlled by other components of two-stage catalytic heating system 100.

In some examples, first-stage catalytic reactor 110 further comprises first-reactor preheater 119 for preheating first-reactor catalyst 114. In the same or other examples, second-stage catalytic reactor 120 comprises second-reactor preheater 129 for preheating second-reactor catalyst 124. One preheater example includes, but are not limited to, a resistive heater (e.g., glow plug). A reactor preheater is used to bring the temperature of the respective catalyst to at least a fuel-supplying threshold before introducing any fuel/syngas into the reactor. Once the catalyst temperature reaches a self-heating threshold the reactor preheater is turned off. It should be noted that some heating of the catalyst is achieved by fuel/syngas oxidation (an exothermic reaction), once the fuel/syngas is allowed into the reactor. Additional operating aspects of reactor preheaters are described below with reference to FIG. 5.

In some examples, two-stage catalytic heating system 100 is configured to operate first-reactor catalyst 114 and second-reactor catalyst 124 at different temperatures. For example, first-reactor catalyst 114 can be maintained from 500° C. to 700° C., while second-reactor catalyst 124 can be maintained from 500° C. and 800° C., Other examples of operating target temperatures are described below with reference to FIGS. 4 and 5. One having ordinary skill in the art would understand that these operating target temperatures depend on the fuel type, oxidant type, fuel-oxidant ratios, catalysts, and other like conditions. The temperature is controlled by controlling the fuel flow rate, the first oxidant flow rate, and the second oxidant flow rate. It should be noted that these flow rates also control the fuel-rich and fuel-lean conditions in first-stage catalytic reactor 110 and second-stage catalytic reactor 120, respectively.

System Controller Examples

Figure 2B:
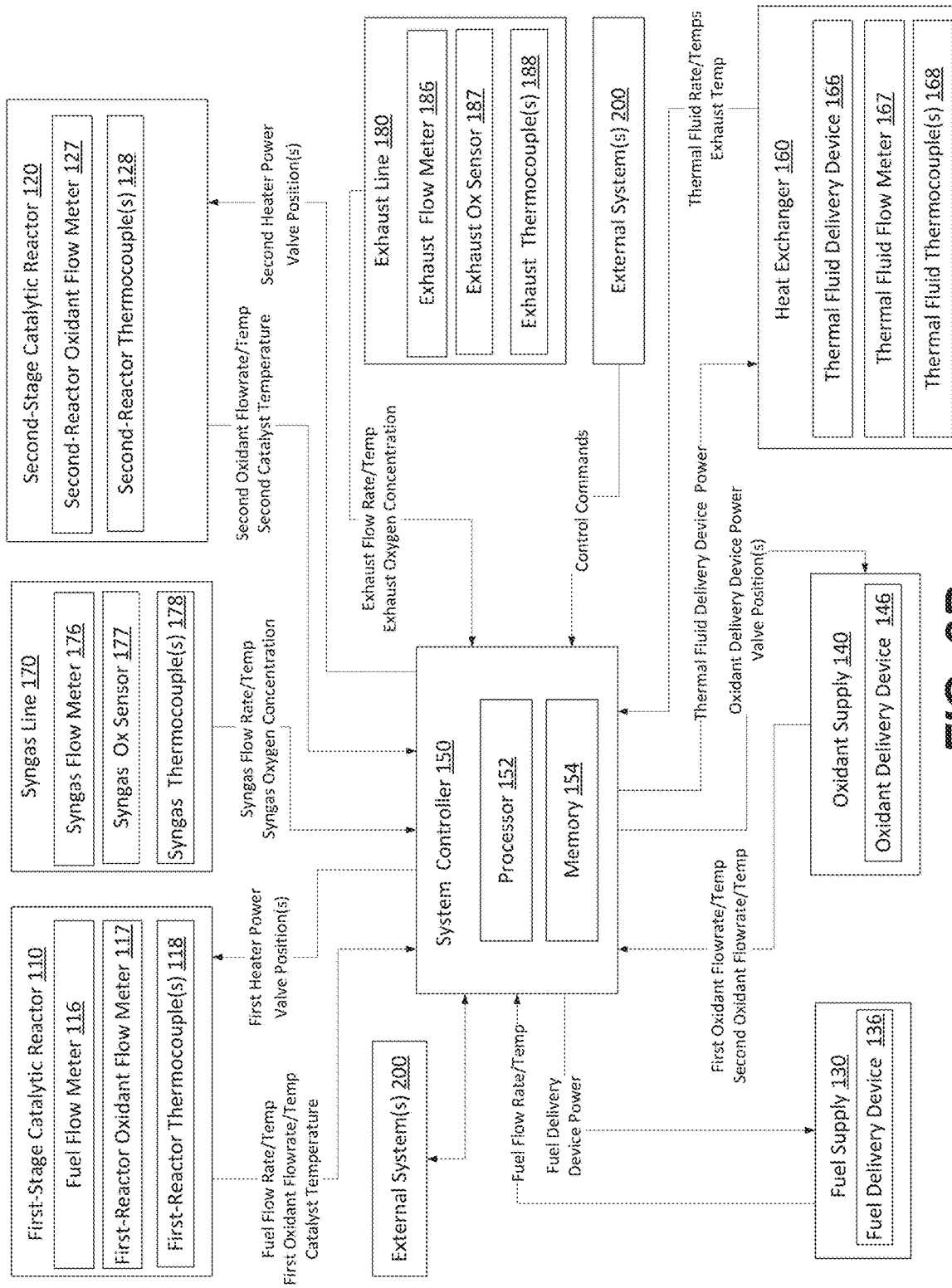
FIG. 2B is a schematic control diagram illustrating a system controller receiving inputs from and transmitting commands to various components of the two-stage catalytic heating system, in accordance with some examples.

In some examples, two-stage catalytic heating system 100 further comprises system controller 150, which is communicatively coupled to each of first-stage catalytic reactor 110 and second-stage catalytic reactor 120 as, e.g., is schematically shown in FIG. 2A and FIG. 2B. Referring to FIG. 2B, in more specific examples, system controller 150 is also communicatively coupled to fuel supply 130 and/or oxidant supply 140. In the same or other examples, system controller 150 is also communicatively coupled to heat exchanger 160, syngas line 170, and/or exhaust line 180. Furthermore, system controller 150 can be communicatively coupled to one or more external systems 200, such as vehicle's electronic control unit (ECU) and the like, For example, the overall operation of two-stage catalytic heating system 100 can be initiated and stopped externally, through commands provided to system controller 150 from external systems 200. On the other hand, system controller 150 can provide various outputs, e.g., heat generation rates, temperatures, emissions, remaining fuel amounts, and the like back to external systems 200.

In some examples, system controller 150 is configured to determine and control the fuel flow rate, the first oxidant flow rate, and the second oxidant flow rate, e.g., based on input from one or more system components, e.g., first-stage catalytic reactor 110, second-stage catalytic reactor 120, fuel supply 130, and/or oxidant supply 140. These flow rates determine the fuel-rich conditions in first-stage catalytic reactor 110 and the fuel-lean conditions in second-stage catalytic reactor 120. In some examples, first-stage catalytic reactor 110 is equipped with fuel flow meter 1:16 and/or first-reactor oxidant flow meter 117 to provide feedback on respective flow rates. In the same or other examples, second-stage catalytic reactor 120 can be equipped with second-reactor oxidant flow meter 127 to feedback on the respective flow rate. It should be noted that these flow meters can be also positioned on other components, e.g., lines to first-stage catalytic reactor 110, fuel supply 130, and/or oxidant supply 140.

In some examples, first-stage catalytic reactor 110 is equipped with one or more first-reactor thermocouples 118, e.g., to measure the temperatures of incoming fuel 190, incoming first oxidant portion 193, first-reactor catalyst 114, and/or outgoing syngas 195. It should be noted that multiple thermocouples can be used to measure the same parameter (e.g., the temperature of first-reactor catalyst 114 at multiple different locations). In the same or other examples, second-stage catalytic reactor 120 is equipped with one or more second-reactor thermocouples 128, e.g., to measure the temperatures of incoming syngas 195, incoming second oxidant portion 194, second-reactor catalyst 124, and/or outgoing exhaust 196. All of these temperature measurements can be supplied to system controller 150 for processing. For example, system controller 150 can use the temperatures of first-reactor catalyst 114 and/or second-reactor catalyst 124 to control the fuel and/oxidant flow rates, e.g., to maintain these temperatures within the operating target range.

In some examples, system controller 150 determines and sends instructions to first-stage catalytic reactor 110 related to the operating power of first-reactor preheater 119 and/or valve positions on the fuel and/or oxidant lines. For example, first-reactor preheater 119 can be controlled based on the temperature of first-reactor catalyst 114, e.g., kept operational until this temperature reaches the self-heating threshold as further described with reference to FIG. 5. In the same or other examples, system controller 150 determines and sends instructions to second-stage catalytic reactor 120 related to the operating power of second-reactor preheater 129 and/or the valve position on the oxidant line.

In some examples, two-stage catalytic heater 105 comprises syngas line 170, connecting first-stage catalytic reactor 110 to second-stage catalytic reactor 120. Specifically, syngas line 170 connects first-reactor outlet 113 to second-reactor fuel inlet 121 and is used to transfer syngas 195 from first-stage catalytic reactor 110 and second-stage catalytic reactor 120. In some examples, syngas line 170 comprises syngas flow meter 176, syngas oxygen sensor 177, and/or syngas thermocouple 178, In these examples, syngas line 170 can transmit the syngas temperature, flow rate, and/or oxygen concentration to system controller 150.

In some examples, two-stage catalytic heating system 100 comprises exhaust line 180, connected to second-reactor outlet 123, and is used to flow exhaust 196 from second-stage catalytic reactor 120. In some examples, exhaust line 180 is connected to heat exchanger 160 (e.g., as shown in FIG. 2A), used for heat recuperation from exhaust 196. In some examples, exhaust line 180 comprises exhaust flow meter 186, exhaust oxygen sensor 187, and/or exhaust thermocouple 188. In these examples, exhaust line 180 can transmit the exhaust temperature, flow rate, and/or oxygen concentration to system controller 150.

In some examples, two-stage catalytic heating system 100 comprises heat exchanger 160 for heat recuperation from exhaust 196. As noted above, exhaust 196 flows into heat exchanger 160 from second-stage catalytic reactor 120. In more specific examples, heat exchanger 160 comprises thermal fluid delivery device 166 (e.g., a pump) for controlling the flow of thermal fluid 198 through heat exchanger 160, thermal fluid flow meter 167 for measuring the flow rate of thermal fluid 198 through heat exchanger 160, and/or thermal fluid thermocouples 168. For example, one thermocouple can be positioned at the thermal fluid inlet, while another thermocouple can be positioned at the thermal fluid outlet to measure the temperature increase of thermal fluid 198 as thermal fluid 198 passes through heat exchanger 160. In these examples, heat exchanger 160 can transmit the thermal fluid temperatures and/or the thermal fluid flow rate to system controller 150. System controller 150 can control the power to thermal fluid delivery device 166, thereby changing the flow rate of thermal fluid 198 through heat exchanger 160.

In some examples, oxidant supply 140 can transmit to system controller 150 the flow rate and/or temperature of first oxidant portion 193 and, separately, the flow rate and/or temperature of second oxidant portion 194. System controller 150 can instruct oxidant supply 140 to change the power of oxidant delivery device 146 (e.g., to increase/decrease the flow rate of oxidant 192) and/or to change the valve position in the lines delivering first oxidant portion 193 and second oxidant portion 194.

In some examples, fuel supply 130 can transmit to system controller 150 the flow rate and/or temperature of fuel 190. System controller 150 can instruct fuel supply 130 to change the power of fuel delivery device 136, e.g., to increase/decrease the flow rate of fuel 190.

System controller 150 comprises processor 152 and memory 154, storing various operating parameters of two-stage catalytic heating system 100. Some examples of these parameters are the fuel-rich target ratio and the target operating temperature of first-stage catalytic reactor 110 as well as the fuel-lean target ratio and the target operating temperature of second-stage catalytic reactor 120. Various other controlled operating parameters are also within the scope, such as flow rates of various components at various stages, temperatures of various components at various stages, and the like. Processor 152 uses various inputs to system controller 150 as well as the operating parameters in memory 154 to determine operating instructions for various components of two-stage catalytic heating system 100, such as power settings for catalyst heaters and delivery devices and/or valve positions.

Heat Recovery Examples

Two-stage catalytic heating system 100 generates heat due to the exothermic oxidation of fuel 190 and provides for one or more ways to recover this heat (e.g., for various needs in a vehicle). Referring to FIG. 2A, in some examples, two-stage catalytic heating system 100 comprises heat exchanger 160, fluidically coupled to second-reactor outlet 123, e.g., using exhaust line 180. Heat exchanger 160 is configured to receive exhaust 196 from second-stage catalytic reactor 120 and to transfer heat from exhaust 196 to thermal fluid 198, which flows through heat exchanger 160. As noted above, in some examples, heat exchanger 160 comprises thermal fluid delivery device 166 (e.g., a pump), which controls the flow of thermal fluid 198 through heat exchanger 160. Various examples of thermal fluid are within the scope, e.g., water (e.g., combined with various additives such as antifreeze) oil, and the like. Thermal fluid 198 may be then circulated through other parts of the vehicle to remove the heat from thermal fluid 198.

Figure 2C:
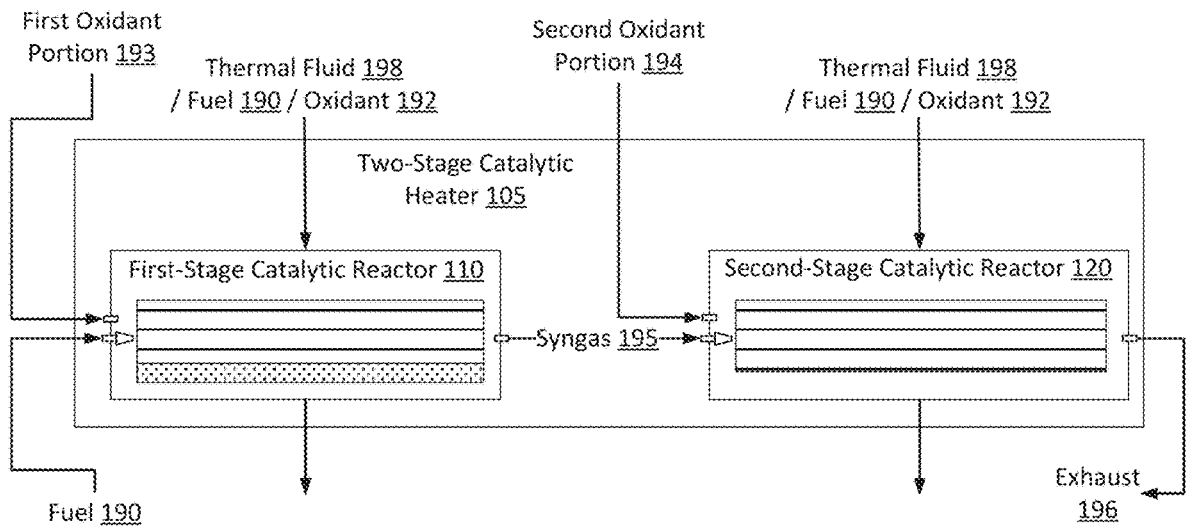
FIG. 2C is a block diagram illustrating various heat exchanging examples in the two-stage catalytic heating system.

Referring to FIG. 2C, in some examples, some or all heat recovery is performed at two-stage catalytic heater 105. For example, first-stage catalytic reactor 110 and/or second-stage catalytic reactor 120 can have integrated heat exchangers for thermal fluid 198 to pass through.

In some examples, first-stage catalytic reactor 110 and/or second-stage catalytic reactor 120 are used for preheating fuel 190 (e.g., vaporizing the liquid fuel) and/or preheating oxidant 192. In some examples, integrated heat exchangers (within first-stage catalytic reactor 110 and/or second-stage catalytic reactor 120) are used in addition to one or more external heat exchanges (e.g., heat exchanger 160 connected to exhaust line 180 and/or another heat exchanger connected to syngas line 170). For example, a heat exchanger connected to syngas line 170 can be used, in part, to control the temperature of syngas 195 entering second-stage catalytic reactor 120.

System Packaging Examples

Figure 2D:
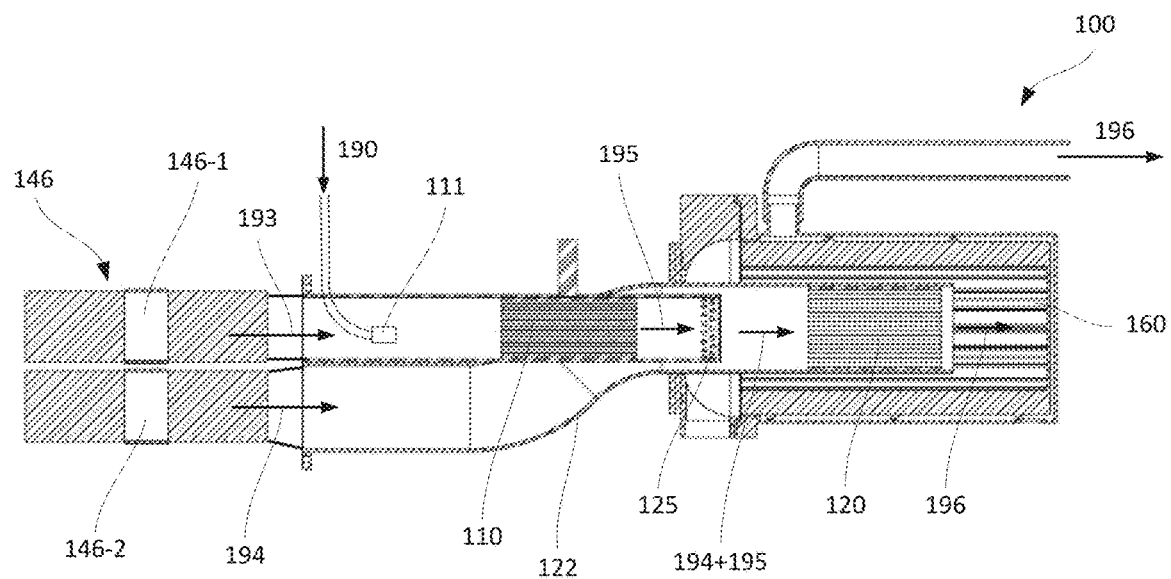
FIG. 2D is a schematic cross-sectional view of the two-stage catalytic heating system, in accordance with some examples.

FIG. 2D illustrates one example of arranging various components of two-stage catalytic heating system 100, In this example, oxidant delivery device 146 comprises two separate components, first oxidant delivery device 146-1 and second oxidant delivery device 146-2, such as air blowers. First oxidant delivery device 146-1 directs first oxidant portion 193 to first-stage catalytic reactor 110. Fuel 190 is delivered through fuel inlet 111, which can include a fuel injector. Syngas 195 leaves first-stage catalytic reactor 110 and is combined with second oxidant portion 194 in second-reactor fuel—oxidant mixer 125. Second oxidant portion 194 is supplied from second oxidant delivery device 146-2 using second-reactor oxidant inlet 122. Specifically, in this example, second-reactor oxidant inlet 122 is positioned parallel to first-stage catalytic reactor 110. A combination of syngas 195 and second oxidant portion 194 enters into second-stage catalytic reactor 120, which produces exhaust 196. Second-stage catalytic reactor 120 sends exhaust 196 through heat exchanger 160 before discharging exhaust 196 from two-stage catalytic heating system 100. Heat exchanger 160 pumps thermal fluid through two-stage catalytic heating system 100.

Vehicle Integration Examples

Figure 3:
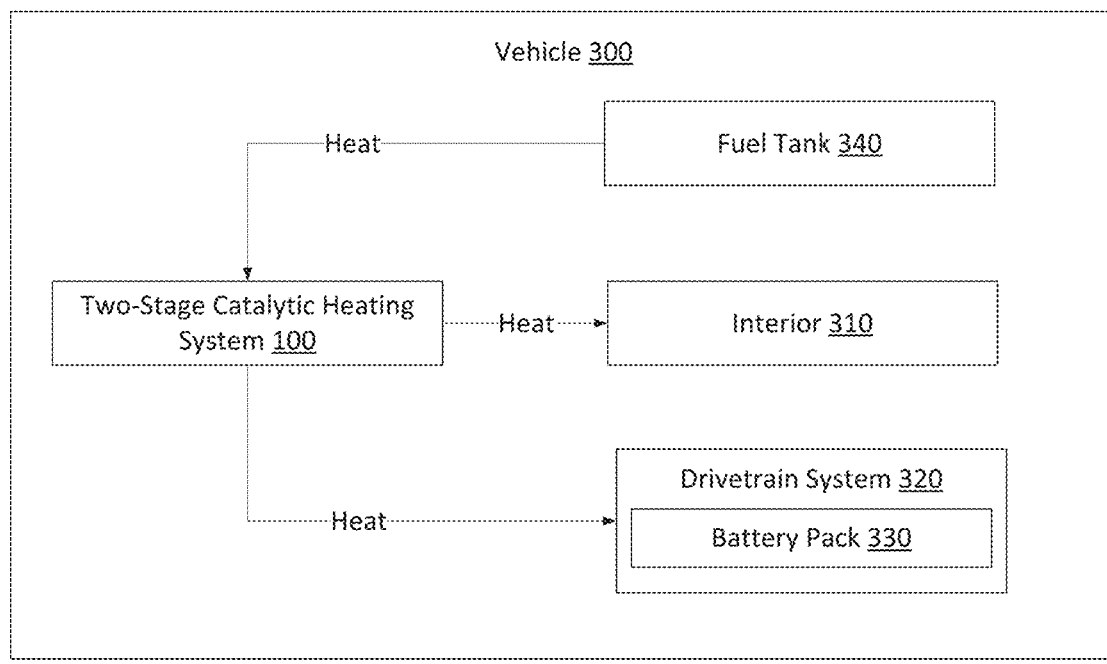
FIG. 3 is a block diagram of a vehicle comprising a two-stage catalytic heating system integrated with other vehicle systems, in accordance with some examples.

FIG. 3 is a block diagram illustrating various examples of integrating two-stage catalytic heating system 100 into vehicle 300. For example, two-stage catalytic heating system 100 can be used to supply heat to interior 310 of vehicle 300 (e.g., to maintain the interior temperature at the desired level, to defrost windows, and the like). Specifically, thermal fluid 198 is pumped between two-stage catalytic heating system 100 (wherein thermal fluid 198 is heated) and a radiator (wherein thermal fluid 198 is cooled to heat air). The radiator may be coupled to an air blower, which directs the heated air from the radiator into the vehicle cabin. In the same or other examples, two-stage catalytic heating system 100 can be used to supply heat to powertrain system 320 or, more specifically, to battery pack 330, One having ordinary skill in the art would appreciate that the operating temperature of battery pack 330 can deviate from the environmental temperature (e.g., vehicle 300 is parked outside during a winter night). To achieve the efficient operation of battery pack 330, thermal fluid 198 can be pumped between two-stage catalytic heating system 100 and battery pack 330 to bring battery pack 330 to the operating temperature.

In some examples, vehicle 300 is equipped with fuel tank 340, e.g., an internal combustion vehicle, a plug-in hybrid vehicle. Fuel tank 340 can be used to supply the fuel to two-stage catalytic heating system 100, effectively eliminating the need for a separate fuel supply at the heating system level. A similar integration can be used on the oxidant supply side.

Examples of System Operation

Figure 4:
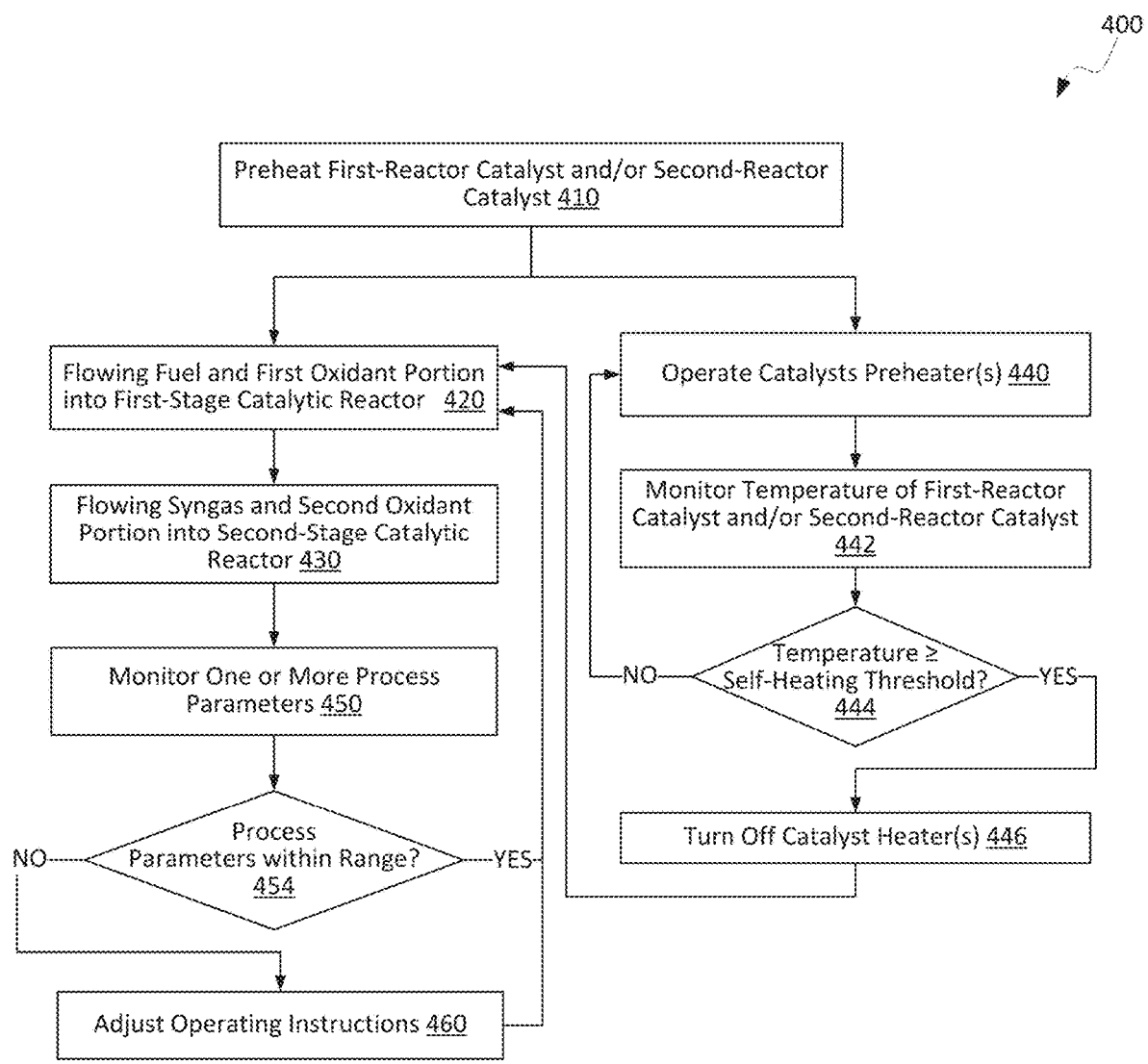
FIG. 4 is a process flowchart corresponding to a method of operating a two-stage catalytic heating system, in accordance with some examples.

FIG. 4 is a process flowchart corresponding to method 400 of operating two-stage catalytic heating system 100, in accordance with some examples. Various examples of two-stage catalytic heating system 100 are described above with reference to FIGS. 2A-2D.

Figure 5:
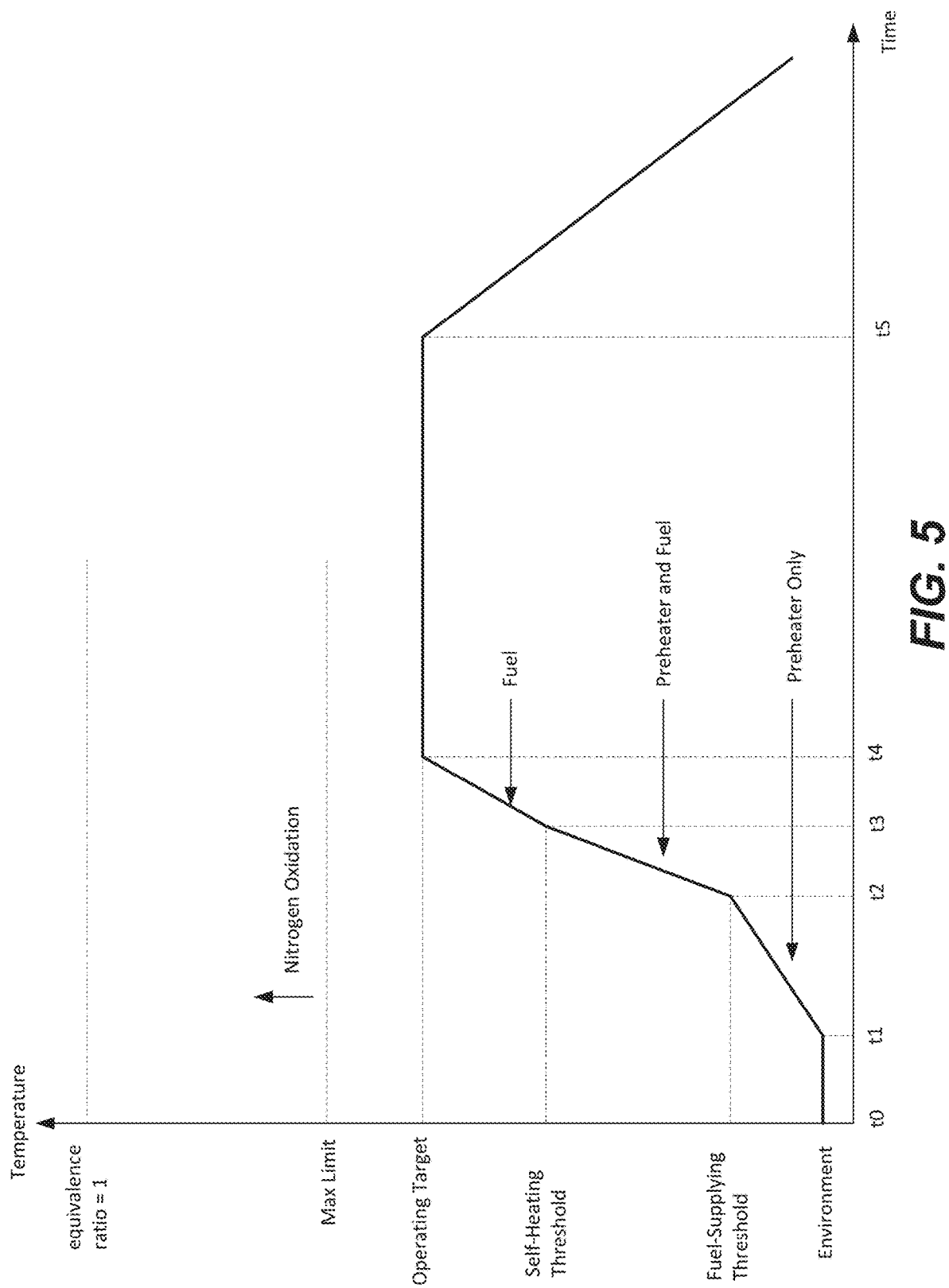
FIG. 5 is a schematic temperature profile, illustrating temperature change during different operating stages, in accordance with some examples.

In some examples, method 400 comprises preheating (block 410) first-reactor catalyst 114 and/or second-reactor catalyst 124 to or above respective fuel-supplying thresholds. A fuel-supplying threshold and other temperature parameters are schematically shown in FIG. 5. For example, before initiating any operations (between t0 and t1), the temperatures of first-reactor catalyst 114 and/or second-reactor catalyst 124 can be the same as the environmental temperature (e.g., below respective fuel-supplying thresholds). Supplying fuel 190 into first-stage catalytic reactor 110 at this temperature would have caused various operating issues (e.g., potentially high emissions, clogging, and like). To avoid these issues, first-reactor catalyst 114 and/or second-reactor catalyst 124 are preheated (between t1 and t2) using their respective reactor preheaters (described above) to above the fuel-supplying thresholds. In some examples, the fuel-supplying threshold (for one of both first-reactor catalyst 114 and second-reactor catalyst 124) is at least 125° C. or, more specifically, at least 150° C. or even at least 175° C. It should be noted that this preheating is performed without supplying fuel 190 into first-stage catalytic reactor 110. In some examples, some amounts of oxidant (e.g., air) can be flown through first-stage catalytic reactor 110 and second-stage catalytic reactor 120.

Overall, in some examples, first-reactor catalyst 114 is heated up to a first-reactor fuel-supplying threshold, at which fuel (190) and first oxidant portion 193 can be supplied into first-stage catalytic reactor 110. In more specific examples, first-reactor catalyst 114 is the only reactor preheated. In other words, second-reactor catalyst 124 is not preheated. Second-reactor catalyst 124 is initially heated by the temperature of syngas 195, carried from first-stage catalytic reactor 110 also from the oxidation of syngas in second-stage catalytic reactor 120.

Alternatively, second-reactor catalyst 124 can be also heated up to a second-reactor fuel-supplying threshold, at which point syngas 195 and second oxidant portion 194 can be supplied into second-stage catalytic reactor 120. Since the fuel supply into first-stage catalytic reactor 110 causes the syngas supply into second-stage catalytic reactor 120, both fuel-supplying thresholds are reached before fuel (190) and first oxidant portion 193 can be supplied into first-stage catalytic reactor 110.

Briefly referring to FIG. 5, the fuel-supplying thresholds can be below the operating target temperature, which may be also referred to as a stable-state temperature. After reaching the fuel-supplying thresholds (at t2), fuel 190 is supplied into first-stage catalytic reactor 110. The fuel oxidation in first-stage catalytic reactor 110 and the syngas oxidation in second-stage catalytic reactor 120 assist with further heating. This oxidation-based heating may be in tandem with operating one or both catalyst preheaters. For example, one or both reactor preheaters can be operated for some time (e.g., unitl t3) while supplying fuel 190 into first-stage catalytic reactor 110. When the catalyst temperatures reach (e.g., at t3) respective self-heating thresholds, the reactor preheaters are turned off. Further heating of the catalysts is performed by the fuel oxidation in first-stage catalytic reactor 110 and the syngas oxidation in second-stage catalytic reactor 120 only, e.g., up until reaching the operating target temperature (e.g., at t4).

Returning to FIG. 4, method 400 comprises flowing (block 420) fuel 190 and first oxidant portion 193 into first-stage catalytic reactor 110 of two-stage catalytic heater 105. First-stage catalytic reactor 110 comprises first-reactor catalyst 114. Fuel 190 and first oxidant portion 193 form a fuel-rich mixture, which is converted into syngas 195 when contacting first-reactor catalyst 114. In some examples, the fuel-rich mixture has an equivalence ratio of first oxidant portion 193 to fuel (190) of less than 1 or less than 0.75, or even less than 0.6. In some examples, this operation comprises controlling the flow rates of fuel 190 and first oxidant portion 193. Furthermore, various temperatures (e.g., the temperature of first-reactor catalyst 114) can be monitored during this operation. Various control aspects are described above with reference to FIG. 2B.

Method 400 comprises flowing (block 430) flowing syngas 195 and second oxidant portion 194 into a second-stage catalytic reactor 120, Syngas 195 and second oxidant portion 194 form a fuel-lean mixture converted into exhaust 196 when contacting second-reactor catalyst 124. In some examples, the fuel-lean mixture has an equivalence ratio of second oxidant portion 194 to syngas 195 of greater than 1, greater than 1.5, or even greater than 175. In some examples, this operation comprises controlling the flow rate of second oxidant portion 194. It should be noted that the flow rate of syngas 195 is not directly controlled. Instead, this flow rate depends on the flow rates of fuel 190 and first oxidant portion 193 and operating conditions of first-stage catalytic reactor 110. Furthermore, various temperatures (e.g., the temperature of second-reactor catalyst 124) can be monitored during this operation. Various control aspects are described above with reference to FIG. 2B.

In some examples, method 400 comprises operating (block 440) one or both catalysts preheaters, e.g., while flowing fuel 190 and first oxidant portion 193 into first-stage catalytic reactor 110. For example, one or both preheaters may be operated until respective catalysts reach the respective self-heating thresholds as described above. In some examples, the self-heating threshold is at least 300° C., at least 350° C., at least 400° C., or even at least 450° C. During this operation, the catalysts are heated by both respective preheaters and by the fuel and syngas oxidation. In some examples, only first-reactor preheater 119 is operated. Method 400 also involves monitoring (block 442) the temperature of first-reactor catalyst 114 and, in some examples, monitoring the temperature of second-reactor catalyst 124. Upon reaching the self-heating thresholds (decision block 444), the corresponding catalyst preheaters are turned off (block 446). It should be noted that further heating may be achieved by oxidizing fuel (190) in first-stage catalytic reactor 110 and by oxidizing syngas 195 in second-stage catalytic reactor 120.

In some examples, method 400 comprises monitoring if (decision block 454) one or more process parameters are within corresponding ranges. If the parameters are not within ranges, method 400 can proceed with adjusting (block 460) operating instructions for one or more components of two-stage catalytic heating system 100. For example, the first catalyst temperature can be maintained by individually controlling the flow rate of fuel 190 and the flow rate of first oxidant portion 193. In the same or other examples, the second catalyst temperature is maintained by individually controlling the flow rate of fuel 190, the flow rate of first oxidant portion 193, and the flow rate of second oxidant portion 194. Other controlled parameters include the power levels of first-reactor preheater 119 and/or second-reactor preheater 129.

In some examples, each of the first-catalyst operating temperature and the second-catalyst operating temperature is maintained at or below 1000° C., e.g., to prevent nitrogen oxide formation. In the same or other examples, the first catalyst temperature is different from the second catalyst temperature. For example, the first catalyst temperature is lower than the second catalyst temperature. One having ordinary skill in the art would understand that each catalyst temperature depends on the fuel type (e.g., natural gas, methanol, ethanol), oxidant type (e.g., air), catalysts, and other factors. In some examples, the first catalyst temperature is between 500° C. and 700° C. or, more specifically, between 550° and 650° C., while the second catalyst temperature is between 600° C. and 800° C. or, more specifically, between 650° C. and 750° C. In other examples, the first catalyst temperature is between 500° C. and 700° C. or, more specifically, between 550° and 650° C., while the second catalyst temperature is between 800° C. and 100° C. or, more specifically, between 850° C. and 950° C. It should be noted that catalyst temperatures correspond to the stable state operation, i.e., operating targets.

Experimental Results

Various experiments have been conducted using an example of two-stage catalytic heating systems described below. These experiments have been conducted using ethanol as a fuel. However, the results for other fuel types are expected to be the same.

Figure 6A:
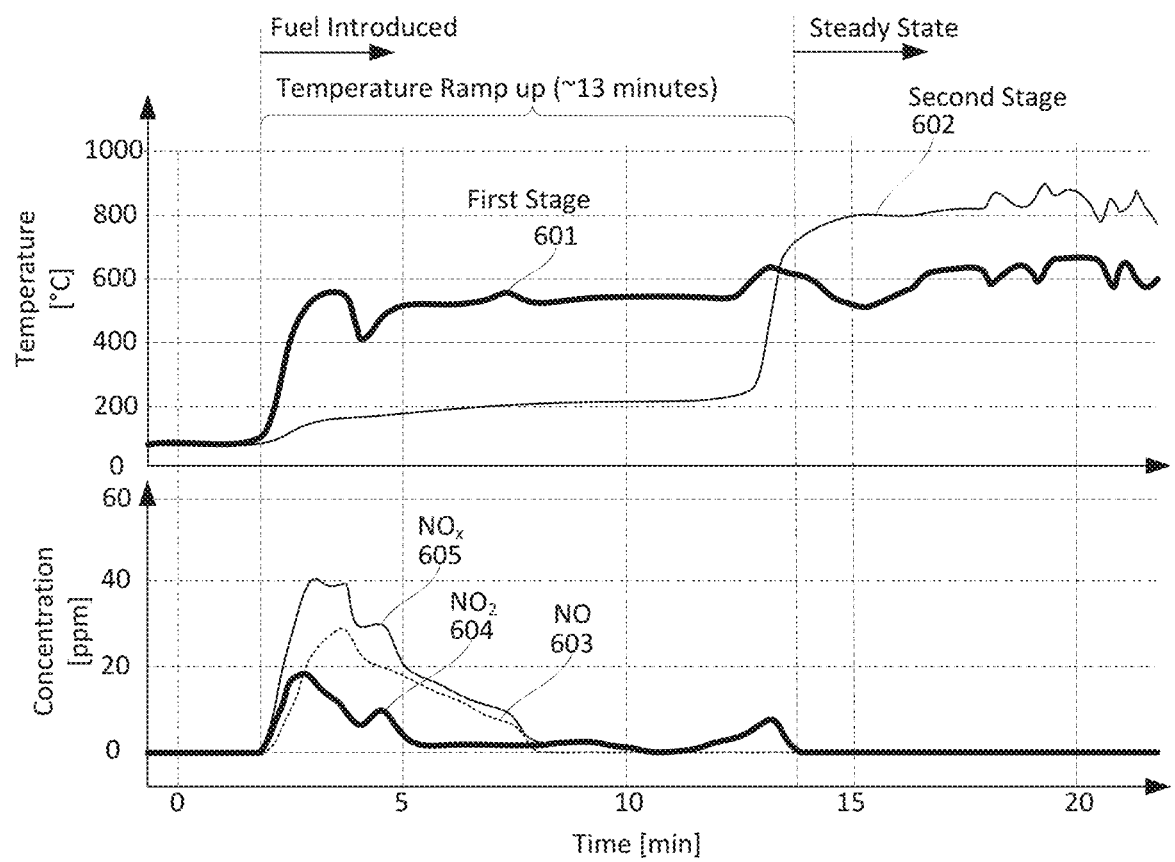
FIG. 6A illustrates temperature profiles at the first and second stages of the two-stage catalytic heating system as well as the corresponding nitrogen oxide concentration profiles during the start-up of the system.

FIG. 6A illustrates temperature profiles at the first stage/catalytic reactor (line 601) and the second stage/catalytic reactor (602) of the experimental system during the system ramp-up. FIG. 6A also illustrates corresponding nitrogen oxide concentration profiles (in the exhaust) during this stage. Specifically, line 603 corresponds to nitrogen monoxide (NO), line 604 corresponds to nitrogen dioxide ($NO_2$), and line 605 corresponds to other nitrogen oxides ($NO_x$). While the first catalytic reactor quickly (within 2-3 minutes) approaches its operating target temperature of 500° C.-700° C., the second catalytic reactor takes about 10 minutes to reach its operating target temperature of 800° C.-1000° C. During this ramp-up, some nitrogen oxides are generated.

However, upon reaching the steady-state operation (after 13 minutes), the concentration of nitrogen oxides in the system exhaust was undetectable.

Figure 6B:
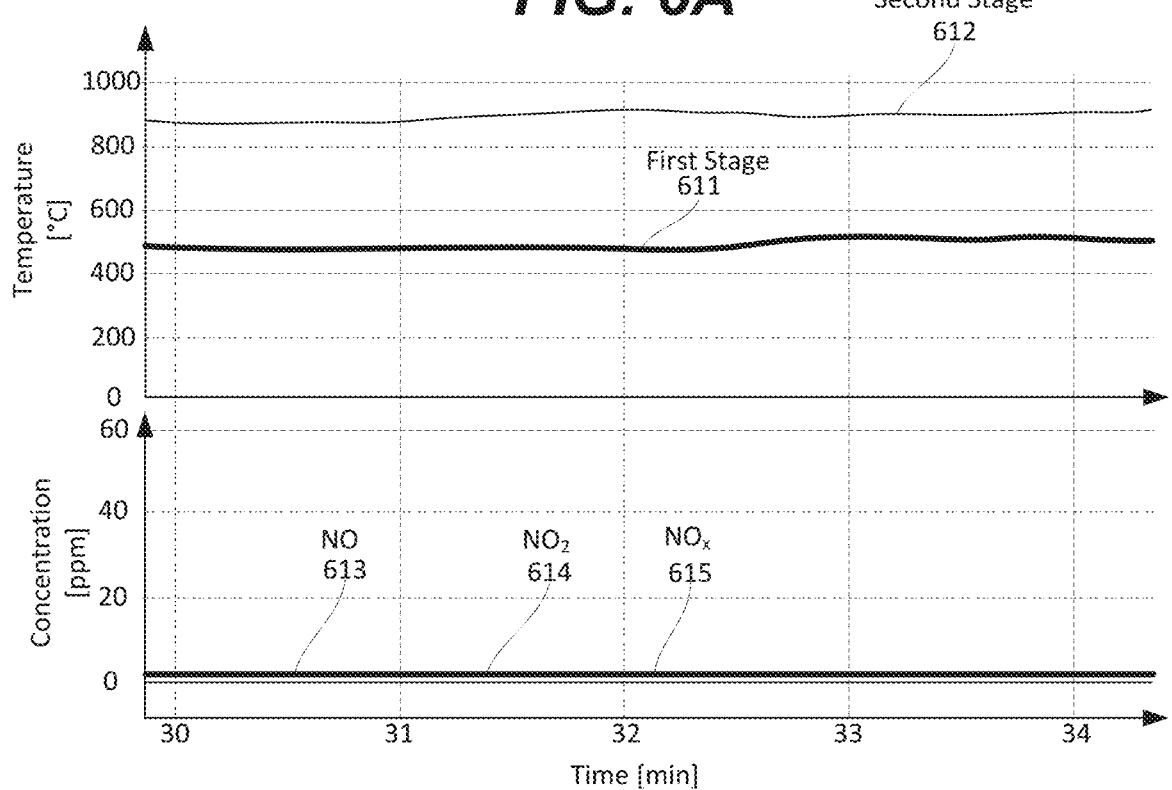
FIG. 6B illustrates temperature profiles at the first and second stages of the two-stage catalytic heating system as well as corresponding nitrogen oxide concentration profiles during the stable-state operation of the system.

FIG. 6B illustrates temperature profiles at the first stage/catalytic reactor (line 611) and the second stage/catalytic reactor (line 612) during the stable-state operation of the system, e.g., about 30-35 minutes after starting the system. FIG. 6B also illustrates corresponding nitrogen oxide concentration profiles (in the exhaust) with line 613 corresponding to nitrogen monoxide (NO), line 614 corresponding to nitrogen dioxide ($NO_2$), and line 615 corresponding to other nitrogen oxides ($NO_x$). In this stable-state operation, the first catalytic reactor operated at about 500° C. while the second stage operated at about 900° C. The concentration of nitrogen oxides in the exhaust was undetectable.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered illustrative and not restrictive.

What is claimed is:

1. A two-stage catalytic heating system using fuel and oxidant to generate heat, the two-stage catalytic heating system comprising:
    a first oxidant delivery device;
    a second oxidant delivery device;
    a first-stage catalytic reactor, comprising a first-reactor fuel inlet, a first-reactor oxidant inlet coupled to the first oxidant delivery device, a first-reactor outlet, and a first-reactor catalyst, wherein the first oxidant delivery device is configured to control a first oxidant portion flow rate delivered to the first-reactor oxidant inlet, and wherein the first-stage catalytic reactor is configured to operate at fuel-rich conditions;
    a fuel supply configured to supply a liquid fuel and comprising a fuel delivery device comprising a fuel pump fluidically coupled to the first-reactor fuel inlet;
    a syngas line fluidically coupled to the first-reactor outlet;
    a fuel-oxidant mixer fluidically coupled to the syngas line and to the second oxidant delivery device, wherein the second oxidant delivery device is configured to control a second oxidant portion flow rate delivered to the fuel-oxidant mixer;
    a second-stage catalytic reactor, comprising a second-reactor fuel inlet fluidically coupled to the fuel-oxidant mixer, a second-reactor oxidant inlet, a second-reactor outlet, a second-reactor catalyst configured to operate at a different temperature than the first-reactor catalyst, and a heat exchanger integrated into the second-stage catalytic reactor and configured such that thermal fluid may be passed through; and
    another heat exchanger connected to the syngas line and configured to control the temperature of syngas entering the second-stage catalytic reactor, wherein:
    the second-stage catalytic reactor is configured to operate at fuel-lean conditions,
    the liquid fuel is selected from a list consisting of methanol, ethanol, and isopropanol.

2. The two-stage catalytic heating system of claim 1, wherein:
    the fuel delivery device is configured to supply the liquid fuel to the first-stage catalytic reactor at a fuel flow rate, wherein:
    a combination of the fuel flow rate and the first oxidant portion flow rate determines the fuel-rich conditions in the first-stage catalytic reactor, and
    a combination of the fuel flow rate, the first oxidant portion flow rate, and the second oxidant portion flow rate determines the fuel-lean conditions in the second-stage catalytic reactor.

3. The two-stage catalytic heating system of claim 2, wherein the first oxidant portion flow rate and the second oxidant portion flow rate are independently controllable.

4. The two-stage catalytic heating system of claim 1, wherein the first-stage catalytic reactor further comprises a first-reactor preheater for preheating the first-reactor catalyst, at least prior to supplying the fuel to the first-stage catalytic reactor.

5. The two-stage catalytic heating system of claim 1, wherein the liquid fuel is selected from the group consisting of methanol and ethanol.

6. The two-stage catalytic heating system of claim 1, wherein:
    the first-reactor catalyst comprises one or more of rhodium and ceria, and
    the second-reactor catalyst comprises one or more of platinum and palladium.

7. The two-stage catalytic heating system of claim 1, wherein the two-stage catalytic heating system is configured to operate the first-reactor catalyst and the second-reactor catalyst at different temperatures.

8. The two-stage catalytic heating system of claim 1,
    further comprising a system controller communicatively coupled to each of the first-stage catalytic reactor and the second-stage catalytic reactor,
    wherein the system controller is configured to maintain the fuel-rich conditions in the first-stage catalytic reactor and the fuel-lean conditions in the second-stage catalytic reactor by controlling a fuel flow rate into the first-stage catalytic reactor, the first oxidant portion flow rate into the first-stage catalytic reactor, and the second oxidant portion flow rate into the second-stage catalytic reactor.

9. The two-stage catalytic heating system of claim 8, wherein the system controller is configured to receive one or more inputs from the first-stage catalytic reactor and the second-stage catalytic reactor, the one or more inputs comprises at least one of temperature of the first-reactor catalyst, temperature of the second-reactor catalyst, temperature of syngas flowing from the first-stage catalytic reactor to the second-stage catalytic reactor, and temperature of exhaust leaving the second-stage catalytic reactor.

10. A method of operating a two-stage catalytic heating system using fuel and oxidant to generate heat, the method comprising:
    flowing liquid fuel and a first oxidant portion into a first-stage catalytic reactor comprising a first-reactor oxidant inlet, a first-reactor fuel inlet, a fuel supply configured to supply the liquid fuel and comprising a fuel delivery device fluidically coupled to the first-reactor fuel inlet comprising a fuel pump, a first-reactor catalyst, and a first-reactor outlet, wherein the liquid fuel and the first oxidant portion form a fuel-rich mixture converted into a syngas when contacting the first-reactor catalyst; and
    flowing the syngas and a second oxidant portion into a second-stage catalytic reactor comprising a second-reactor catalyst configured to operate at a different temperature than the first-reactor catalyst, a heat exchanger integrated into the second-stage catalytic reactor and configured such that thermal fluid may be passed through, and a fuel-oxidant mixer, wherein the syngas and the second oxidant portion form a fuel-lean mixture converted into exhaust when contacting the second-reactor catalyst, wherein:

the first-reactor oxidant inlet is coupled to a first oxidant delivery device, the first oxidant delivery device is configured to control a first oxidant portion flow rate delivered to the first-reactor oxidant inlet, a syngas line is fluidically coupled to the first-reactor outlet, another heat exchanger is connected to the syngas line and configured to control the temperature of syngas entering the second-stage catalytic reactor, the fuel-oxidant mixer is fluidically coupled to the syngas line and to a second oxidant delivery device configured to control a second oxidant portion flow rate delivered to the fuel-oxidant mixer, and the liquid fuel is selected from a list consisting of methanol, ethanol, and isopropanol.

11. The method of claim 10, further comprising, prior to flowing the liquid fuel and the first oxidant portion into the first-stage catalytic reactor, heating the first-reactor catalyst using a first-reactor preheater to a temperature of at least a first-reactor fuel-supplying threshold.

12. The method of claim 11, wherein heating the first-reactor catalyst using the first-reactor preheater continues while flowing the liquid fuel and the first oxidant portion into the first-stage catalytic reactor.

13. The method of claim 10, wherein the temperature of the first-reactor catalyst is maintained at a first operating target by individually controlling flow rate of the liquid fuel and the first oxidant portion flow rate.

14. The method of claim 10, wherein the temperature of each of the first-reactor catalyst and the second-reactor catalyst is maintained below 1000° C.

15. The method of claim 10, wherein the first-stage catalytic reactor and the second-stage catalytic reactor are maintained at different operating temperatures.

16. The method of claim 10, wherein the first-stage catalytic reactor is maintained at a lower operating temperature than the second-stage catalytic reactor.

17. The method of claim 10, wherein:
the first-stage catalytic reactor is operated at between 500° C. and 700° C., and
the second-stage catalytic reactor is operated at between 600° C. and 800° C.

18. The method of claim 10, wherein:
the fuel-rich mixture has an equivalence ratio of the first oxidant portion to the fuel of less than 0.75, and
the fuel-lean mixture has an equivalence ratio of the second oxidant portion to the syngas of at least 1.5.

19. The method of claim 10, wherein the liquid fuel is selected from the group consisting of ethanol and methanol.

20. The method of claim 10, wherein heat is transferred from the exhaust to a thermal fluid flowing through the heat exchanger.

* * * * *